Oct. 16, 1951     T. S. LINDABURY     2,571,734
TEMPERATURE REGULATING AND CONTROL VALVE
Filed June 26, 1948     2 SHEETS—SHEET 1
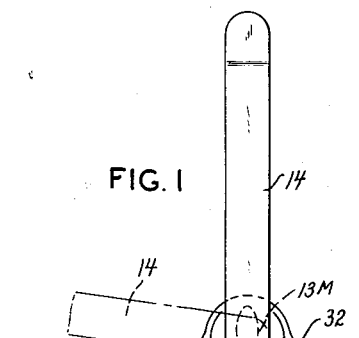
FIG. 1
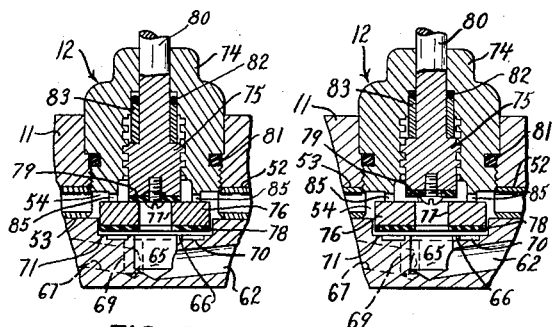
FIG. 7     FIG. 8
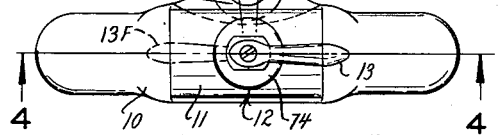
FIG. 2     FIG. 3
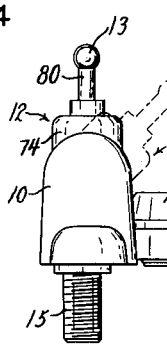
FIG. 4
INVENTOR
TRYON S. LINDABURY
BY Frederick M. Woodruff
ATTORNEY Oct. 16, 1951        T. S. LINDABURY        2,571,734

TEMPERATURE REGULATING AND CONTROL VALVE

Filed June 26, 1948        2 SHEETS—SHEET 2

INVENTOR
TRYON S. LINDABURY

BY *Frederick M. Woodruff*

ATTORNEY

Patented Oct. 16, 1951

2,571,734

UNITED STATES PATENT OFFICE 2,571,734

TEMPERATURE REGULATING AND CONTROL VALVE

Tryon S. Lindabury, Overland, Mo.

Application June 26, 1948, Serial No. 35,484

7 Claims. (Cl. 277—8)

This invention relates to fluid flow control and temperature regulating valves, and I have chosen, by way of example only, particularly to describe my improvements in connection with a valve construction which will enable the drawing of water from either a hot or a cold supply line, or will enable a selective intermixing of hot and cold water supplies to regulate the temperature of the water discharged.

The broad object of my invention is attained in and by a valve construction of simple, compact and inexpensive design which may be employed in fluid supply systems having distinct hot and cold feed lines to permit a selective volume flow regulation from either hot or cold feed lines, and a selective intermixing of the hot and cold fluids to obtain a final discharge temperature of the desired order.

It is also my object to provide a valve of this type having simplified control means through which are consolidated the essential valve motions and fluid flow control functions to achieve a fluid volume regulation for either fluid of the system, and a fluid intermixing as well as volume regulation thereof.

Another important object of my invention is found in certain improved features of construction and arrangement which will permit the fluid flow control factors, as selective volume and temperature regulation, to be achieved with substantially no impairment of one factor upon alteration of the other factor, it thus being made possible to vary the volume of fluid flow without altering the selected temperature, and on the other hand to vary the temperature of the fluid flow without altering the selected rate or volume of flow.

Still another object of this invention is to be found in an improved and novel arrangement of separate and common fluid flow passages, conduits, chambers and the like, formed in the cooperating parts of the valve structure, such that a minimum number of fixed and moving parts are required, and the valve may be easily adapted to a wide range of installations by the simple expedient of adding or removing interchangeable or accessory parts.

The foregoing and other objects will be more particularly described in connection with the embodiment of my valve which is presently preferred by me, and which I have shown in the accompanying drawing, wherein:

Fig. 1 is a top plan view of the valve assembly as adapted for use in the water supply lines to a sink installation, and in which view I have indicated the direction of movement of the valve control means for selecting desired conditions of volume flow;

Fig. 2 is an elevational view of the valve assembly from the rear thereof;

Fig. 3 is an elevational view of the valve assembly from one end, and in which the motion of a flow controlling member for selecting both or either of two fluids has been shown;

Fig. 4 is an enlarged and longitudinal sectional elevation taken at line 4—4 of the valve assembly of Fig. 1 to show the principal features of its construction;

Fig. 7 is a fragmentary sectional elevation of the control valve means shown in Fig. 4, but in which a preliminary condition of valve adjustment is shown;

Fig. 8 is similar to Fig. 7, but in which a still further valve adjustment has been indicated;

Figure 6:
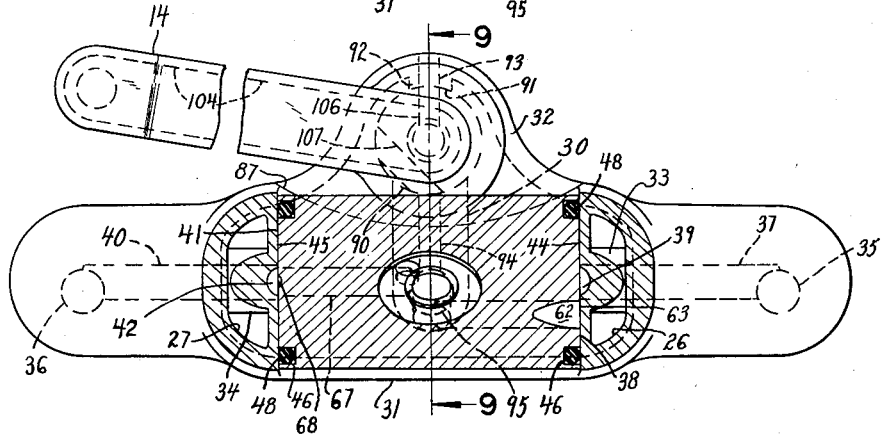
Fig. 6 is a plan view similar to that in Fig. 5, but illustrating a different control setting thereof.
Figure 9:
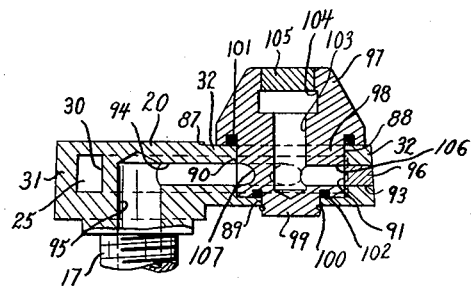
Figure 10:
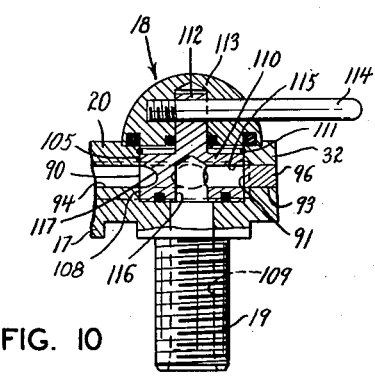

Fig. 9 is a fragmentary and transverse sectional elevational view through the valve to show the details of construction and mounting of the sink type swing spout, the view being taken at line 9—9 in Fig. 6, and Fig. 10 is a view similar to that of Fig. 9, but in which view the swing spout has been replaced by a selector valve and the valve body has been modified in certain respects to indicate how the assembly may be modified to become adaptable for use in connection with a combination tub and shower installation.

Considering the valve assembly shown in Figs. 1, 2 and 3, as the same would appear for installation as a sink fixture, it can be appreciated that the assembly is comprised of a casting or body 10 having internally cored passages as will hereinafter appear, a control member 11 rotatively or angularly movably mounted on the body casting 10, a valve unit 12 carried by the member 11 in position to have its control handle 13 freely exposed for easy access, and a discharge member or spout 14 swingably mounted on the body casting 10 so as to extend outwardly and above a sink well or basin (not shown). The body 10 is seen to have a plurality of depending and integrally formed, threaded coupling bosses disposed at its under surface. These bosses serve, as the means for securing the fixture to the back board or similar area of the sink and also act as a part of the connections for water supply lines and service take-off lines. In the present fixture, boss 15 may be assumed as connected to a hot water supply line, boss 16 may be assumed as connected to a cold water supply line, and the centrally located boss 17 may be assumed as connected to a flexible or other conduit leading to a sink spray attachment, not shown, but assumed to be of the usual types.

Figure 5:
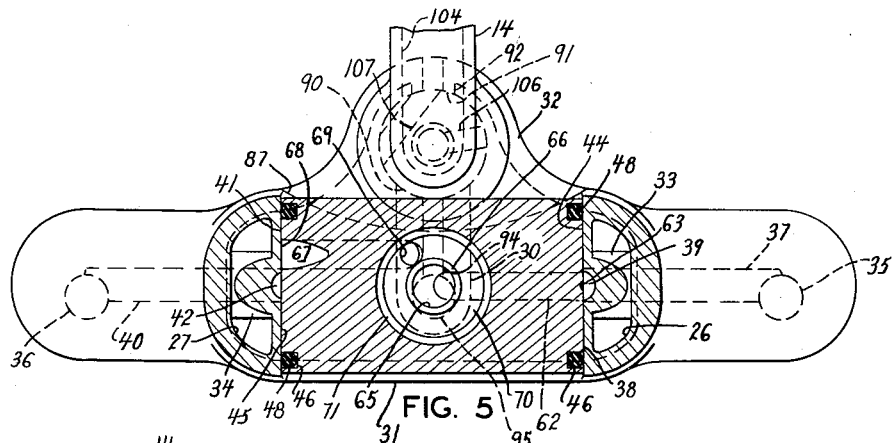
Fig. 5 is an enlarged and partial sectional plan view of the valve assembly to show the arrangement and direction of water flow passages, conduits and the like, the view being taken at line 5—5 in Fig. 4.

The body 10 of my improved valve, as illustrated in Figs. 4, 5 and 6, is formed as a casting having cored passages formed therein. I prefer that the body have a symmetrical form at opposite sides of a transverse median plane to simplify the function of the body, reduce casting problems and to gain a more pleasing appearance for the final fixture, of which it is a part. In Fig. 4, the body 10 is shown as having a central portion 20, integrally formed with oppositely directed body extensions 21 and 22, and spaced, vertically directed shoulders 23 and 24. The shoulder 23 is located adjacent body extension 21, shoulder 24 is located adjacent body extension 22, and these vertical or upstanding shoulders are spaced longitudinally to define with the central body portion 20 a saddle-like seat area in the body to receive the control member 11 previously noted. In further characterization of the body 11, it will be noted that the respective fluid line connection bosses 15, 16 and 17 are formed on and spaced along the under surface, with bosses 15 and 16 respectively located at the body extensions 21 and 22, and boss 17 located intermediate the length of the central portion 20.

During the casting of the body 10, suitable cores are utilized in the mold so that the interior of the central portion 20 and each shoulder 23 and 24 contains a portion of a common fluid discharge passage, denoted generally as 25. This passage is constituted by vertical passage sections 26 and 27 respectively in shoulders 23 and 24, and an interconnecting passage section 28 in the central body portion 20. Also during the casting of the body 10, the central body portion 20 is provided with an island or internal boss 30 which bridges the top and bottom walls of the passage section 28 and extends transversely of the longitudinal body axis (Figs. 5, 6 and 9) from a zone free of connection with the rear wall 31 of the body and over the depending boss 17 to the front of the body, and more particularly into the zone of a forwardly directed body extension 32 of the central portion 20. Thus, fluid entering passage section 28 may flow about and around the island boss 30 without interruption. The vertical passage section 26 in shoulder 23 contains an internal boss 33 which bridges its opposite vertical end walls but is free of connection with the opposite side walls to enable the free flow of fluid around the same (Figs. 5 and 6). Similarly, the opposite vertical passage section 27 contains an internal boss 34 which bridges the opposite end walls, but is free of connection with the side walls for flow of fluid around the same.

The body 10 is provided with a fluid inlet passage 35 drilled through the boss 15 to enter the body extension 21, and a similar drilled passage 36 for fluid inlet flow is provided in the opposite boss 16 and body extension 22. The passage 35 communicates with a laterally and upwardly inclined flow passage 37 which pierces the boss 33 and opens through the face of the flat wall 38 on the inner side of shoulder 23 to form the outlet port or end 39 of the communicating fluid inlet passages 35 and 37. In like manner, the opposite drilled passage 36 communicates with a laterally and upwardly inclined flow passage 40 which pierces the boss 34 and opens through the face of the flat inner wall 41 of shoulder 24 to form the outlet port or end 42 of the communicating passages 36 and 40. The inclined passages 37 and 40 (Figs. 5 and 6) are located substantially in the same longitudinal plane and have their respective outlet ports 39 and 42 positioned at the same elevation so as to be in apposed longitudinal relationship, for a purpose hereinafter to be noted.

Control member 11 of the present valve assembly is shown as being a cylindrical part which is adapted to fit within the saddle-like seat area of the body 10 between the opposite flat faces 38 and 41 of the respective shoulders 23 and 24. Member 11 is carefully formed to have a close working fit between the faces 38 and 41, such that endwise play of the member is reduced as much as possible. The body shoulders 23 and 24 are each formed to have the upper portion circular or arcuate in elevation so as to have a matching surface fit with member 11 and thereby impart a streamlined appearance to the assembly for all positions of angular or rotational displacement of the member relative to the body.

Member 11 is provided with flat end faces 44 and 45 respectively adjacent the faces 38 and 41 of the opposite body shoulders, and each end face is axially recessed at 46 near its periphery and at 47 adjacent its central zone. These outer and inner annular recesses 46 and 47 receive suitable sealing elements, shown as toroidal rings 48 and 49 respectively, which are circular in section. The inner recesses 47 are located at the opposite ends of an axially drilled bore in the member 11. This axial bore is shown in two sections at 52 and 53 (Figs. 4, 7 and 8), and these sections open at their inner ends to a chamber 54 formed in the member 11, as by suitable drilling and counter-boring the member in a direction transversely of the longitudinal axis thereof. The outer open end of the bore forming chamber 54 is adapted to receive the valve assembly 12.

The operative mounting of member 11 in the body 10 is effected by sleeve elements 55 and 56 pushed into the respective bore sections 52 and 53 from the ends thereof opening to the chamber 54. The outer end of each of these sleeves engages in a bore or bearing aperture 57 formed one in each flat face 38 and 41 of the respective shoulders 23 and 24. These bearing apertures 57 are formed by working through larger drillings 58 from the outer side of the shoulders to the body passage portions 26 and 27. After the apertures 57 are drilled, the larger drillings 58 are closed and sealed by plugs 59 which are ground off or finished flush with the exterior face of the body shoulders. Each plug 59 has an inner beveled end face to serve as a stop abutment for the adjacent sleeve element, and yet not act to close the open end thereof. This feature is clearly shown in Fig. 4, and it will also be understood that each sleeve 55 and 56 is utilized as a fluid flow conduit for establishing communication between the chamber 54 of member 11 and each of the body passage sections 26 and 27.

In the sectional assembly view of Fig. 4, it will be observed that the sleeves 55 and 56 are located in the longitudinal axis of member 11 and serve as bearings for the rotational movement of the member. It is unimportant in this assembly to have the sleeves fixed either in the body apertures 57 or the bores 52 and 53 of member 11, as the inner annular and toroidal sealing elements 49 will act to prevent fluid leakage at the close fitting faces 38 and 44 and opposite faces 41 and 45. The length of the bearing sleeve element 55 and 56 is chosen such that each has an inlet end in the periphery of chamber 54 and an outlet end at the abutment plugs 59. A further feature resides in the location of the bearing sleeves above the respective ports 39 and 42 for each of the passages 37 and 40 leading upwardly from connection at the spaced fluid inlet passages 35 and 36. In so locating these sleeves above the ports 39 and 42, it will become obvious that the ports are eccentric to the axis of rotation of the member 11, and that the adjacent end faces of the member will swing or slide relative to and across these port locations. These sliding zones are effectively sealed against both internal and external fluid leakage by the aforementioned toroidal sealing elements 49 and 48 respectively. In a valve assembly of this character, the sealing elements 48 and 49 also, and importantly act as the means for holding the movable member 11 in any of its control positions by exerting a frictional restraining load thereon which is easily overcome upon manual valve operation. The water pressure in the valve passages and conduits does not exert any unbalanced force on member 11 to cause it to move out of a given setting.

In Figs. 4, 5 and 6, and in fragmentary part in Figs. 7 and 8, I have shown a first flow conduit 62 formed in the member 11 and located parallel with and radially below the axis of the sleeve 55. This conduit 62 lies in a diametral plane of member 11 (Figs. 4 and 5) and extends from an inlet end 63 in full open registry with the port 39 of body passage 37, to an outlet end 64 opening to a central well 65 formed at the lower or bottom side of chamber 54. The opening of well 65 at the bottom central area of chamber 54 is defined by a raised rim or land 66 of annular form, shown best in Figs. 7 and 8. A second conduit 67 is also formed in member 11 and is located parallel with but eccentric to the longitudinal axis of the member. Thus the second conduit 67, as shown in Fig. 5, has its inlet end 68 to one side of and completely out of registry with the outlet port 42 of the body passage 40. This conduit 67 extends below the bottom of chamber 54 and opens in a second well 69, the axis of well 69 being parallel with the axis of well 65 but eccentric to the axis of the chamber 54. The upper open end of well 69 communicates with an annular recess 70 formed by the central land or rim 66 and an outer annular shoulder 71 at the lower periphery of chamber 54. The recess 70 and shoulder 71 are best seen in Figs. 7 and 8.

As may be seen in Figs. 4, 7 and 8, the valve assembly 12 includes a collar means 74 threadedly mounted in the member 11 to close the outer zone of chamber 54, a valve plug 75 having suitable threading connection internally of the collar 74, a freely movable and floating type piston valve member 76 of annular form whereby to provide a central port 77, and a washer-type valve element 78 of similar form and size, except for thickness, as the piston member 76. The valve plug 75 carries a valve washer 79 at its lower end for closing the port 77 in member 76, and the opposite end of this plug is formed with an integral and elongate operating stem 80 which projects outwardly of the collar 74 and carries the handle 13 previously described. The collar 74 is sealed against leakage at the member 11 by a suitable toroidal element 81, and the stem 80 of the plug 75 is also sealed against leakage by the element 82. A spacer sleeve 83 is disposed on the stem 80 between the plug 75 and sealing element 82 to prevent the latter from escaping from its annular and elongate seat formed between the stem and collar bore.

In assembly, the floating piston valve has a fit within the chamber 54 such that there is a slight looseness about its periphery to permit or establish a leakage path between it and the circumferential vertical wall of the chamber 54, when and during such time as the piston and its washer element 78 are raised from the concentric lands 66 and 71 in the bottom of the chamber. In this connection, it will be appreciated that the lands 66 and 71 form valve seats against which the washer element 78 is pressed by the floating piston 76 upon downward threading rotation of the valve plug 75 to bring its valve element 79 down and in seating closure over the central port 77 of the piston. This last described positionment of the valves is shown in Fig. 4 and it can there be seen that the washer 78 acts to close the annular recess 70 supplied from the well 69, while the washer element 79 on valve plug 75 closes the central port 77 in the piston 76 and, thus, cuts off flow from the well 65. The flow is completely shut off in this setting of the valves, and the leakage path around the floating piston 76 is interrupted by the washer 78 seating on the annular lands 66 and 71.

The floating piston 76 is normally subjected to the pressure of the fluid in the well 69 and annular recess 70 which pressure tends constantly to drive the piston upwardly and raise the washer 78 therewith. However, the piston and washer are held against movement off the valve seats by the plug 75 engaging the upper face of the piston in the zone of the central port 77. Upon proper rotation of the handle 13, stem 80 and its plug 75 can be threaded upwardly in the collar 74 to permit fluid pressure to drive the floating piston upwardly also. This fluid pressure will act to keep the port 77 closed by constantly pressing on the piston. During this initial rise of the piston, the fluids in wells 65 and 69 can intermix in the lower section of the chamber 54 and only a slight leakage can occur in the manner before stated. Upon the proper rise of the piston 76 by upwardly threading of the plug 75, the perimetral zone of the piston contacts a plurality of circularly spaced and axially extending stop elements 85 integrally formed at the lower end face of the collar 74. Abutment of the piston with these stops 85 (Fig. 7) prevents or limits further upward piston movement, and thereafter the continued rotation and upward movement of the plug 75 beyond the piston element will lift its valve element 79 from port 77 in piston 76 and establish a fluid flow path through the chamber 54 from the wells 65 and 69 to the sleeve conduits 55 and 56 (Fig. 8).

Turning now to Figs. 5 and 6, it will be seen that the member 11 is positioned or rotated (Fig. 5) to bring the chamber 54 into a relatively vertical position for the purpose of selecting full fluid flow from passage 37 in body 10 to conduit 62 in member 11. At this time the passage 40 and conduit 67 are out of registry so that no fluid can pass from one to the other. Thus, fluid from one only of the two supply lines can be permitted to flow to the chamber 54 for ultimate delivery. It should be noted that the setting of member 11 relative to the body 10, as in Fig. 5, corresponds to the full line position of handle 13 and valve assembly 12 in Fig. 3. As before noted, this latter control setting of member 11 will afford a supply of hot water alone and fully close off the cold water supply.

An opposite condition is shown by Fig. 6, wherein member 11 has been rotated so that the passage 37 and conduit 62 are out of registration, and the passage 40 and conduit 67 are in full registry. Attainment of this setting of the member 11 relative to body 10 is had upon rotational displacement of the member to the dotted line position of parts 12 and 13 shown in Fig. 3. Positioning of the member 11 at any setting intermediate those shown in Fig. 3 will selectively register the member conduits 62 and 67 with the respective and corresponding body passages 37 and 40 in an inversely proportional relation such that more of one fluid than the other will be allowed to pass from the body to the member. Of course, there will be a mid-position of member 11 for selecting substantially equal flow conditions of the two fluids.

Regulation of the quantity flow of fluid from the chamber 54 of member 11 is provided through turning of the stem 80 by handle 13. Thus, zero flow is indicated in Fig. 4 with the handle 13 approximately parallel to the axis of the member 11. This corresponds with the full line position of handle 13 in Figs. 1 and 2. With the handle 13 of Fig. 1 rotated toward the front of the fixture, the floating piston 76 will be elevated in chamber 54 to permit the slight leakage mentioned and an intermixing of the two fluids if desired, but no flow can occur. Hence, the dotted line position 13M of the handle corresponds with the setting of the valves in Fig. 7. For a full flow delivery from the fixture, the position 13F of the handle in Fig. 1 must be attained, and this corresponds with the valve settings shown in Fig. 8. Positionment of the control handle 13 intermediate its settings 13F and 13M (Fig. 1) will effectively throttle the discharge at spout 14 according to the demand.

The discharge of fluid at spout 14 (Fig. 3) is obtained in a manner now to be described, and particular reference is directed to Figs. 5, 6 and 9. It will be remembered, that in casting the body 10 the internal cores produced the island boss 30 in passage section 28, and that this boss 30 extended into the forward body extension 32. This extension 32 is utilized for mounting the spout 14, and accordingly its upper face is suitably machined to provide a flat seat area located outwardly of and defined by the arcuate shoulder 87. An enlarged aperture 88 is formed through this seat, and the bottom wall of the extension 32 is also provided with a reduced aperture 89 in axial extension of the larger aperture. In cutting the aperture 88, a portion of the boss 30 is also cut to form an arcuate end face 90 which is diametrically opposite a smaller arcuate face 91 of an internal boss 92 formed in the body extension 32 in axial but spaced alignment with the face 90 on boss 30. Thus the arcuate faces 90 and 91 define limited circumferential wall zones of the aperture 88 with substantial openings therebetween in communication with the passage section 28. A horizontal bore is formed through the front wall of extension 32, as at 93, and this bore is also continued into the boss 30, as at 94, to terminate at the bore 95 drilled upwardly in the depending boss 17. The front bore 93 is sealed by a flush plug 96 (Fig. 9) and is merely provided as the means for drilling the more important internal bore 94 in boss 30. It can now be seen that fluid may pass from the passage section 28 into bore 94 and to the bore 95 in boss 17. When used as a sink fixture, the threaded boss 17 (Figs. 2 and 9) provides the take-off connection for a spray hose (not shown). Thus there are two avenues of fluid discharge from the fixture, one at boss 17 and the other through spout 14.

Control over the discharge at either spout 14 or boss 17 is provided in and by the base portion 97 of the spout 14 (Fig. 9). The base 97 is formed with a cylindrical extension 98 which forms both a pivot and a valve element in connection with the spout 14. The extension element 98 has a close fit in the enlarged bore 88 of the body extension 32, and an integral projection 99 extends through the lower aperture 89 sufficiently to be engaged by a snap-ring 100 which locks the spout base 97 against removal. Suitable fluid sealing elements 101 and 102 are provided in the undercut shoulders of the element 98 and its extension 99 (Fig. 9). The spout base 97 is drilled from its upper flat face to form an axial bore 103 which is open to the spout passage 104, and the resulting open end of the axial bore 103 is sealed by a suitable flush plug 105.

The valve element or extension 98 is further provided with a radially directed port 106 which opens from the bottom zone of the axial bore 103 through the cylindrical wall of the extension. In addition a chordally directed passage 107 is formed in the extension 98. This passage 107 is open at its opposite ends, and its axis is angularly directed relative to the radial port 106, in the manner shown in Figs. 5 and 6. In Fig. 5, the spout 14 is shown in its straight forward position, and in such setting the radial port 106 is located substantially at right angles thereto so as to open between the front arcuate face 91 of boss 92 and the arcuate end face 90 of the boss 30 and into the passage section 28 of the central body zone 20. This permits fluid flow outwardly of the passage 28 through port 106 and into the spout 14 for discharge at the sink (not shown). The chordal passage 107, in the showing of Fig. 5, is so angularly directed that one end is closed by the arcuate face 91 of boss 92, and its opposite end is open to the passage section 28 at the opposite side from the radial port 106. Passage 107 is, thus, ineffective to pass fluid.

As the spout 14 is rotated in a counter-clockwise direction, from its position in Fig. 5 to that shown in Fig. 6, the radial port 106 moves into the zone of the arcuate face 91, while the chordal passage 107 moves into the arcuate end face 90 and opens at the bore 94 in the boss 30 to place this bore 94 in communication with the passage section 28. Fluid flow is cut off at the spout 14 and the discharge of fluid is directed to the spray line (not shown) connected at the depending boss 17 (Fig. 9). It will now appear that swinging movement of spout 14 controls the delivery of fluid either at the spout (Fig. 5) or at a suitable spray head connected to the fixture, the latter discharge occurring with the spout moved to the left, as in Figs. 6 and 9.

Referring again to Figs. 4, 5 and 6, it will be clear that the supply of hot water at boss 15 and cold water at boss 16 are selectively controlled by rotative positionment of member 11 to obtain either all hot or cold water or a mixture of both. The selection of the volume of flow is regulated by the valve assembly 12 through proper positioning of the handle 13 to move the valve 75 and the floating piston 76 in the order and relation shown by Figs. 7 and 8. The resulting discharge from the chamber 54 for the valve assembly 12 passes through the sleeve conduits 55 and 56 into the body passage sections 26 and 27 where it is collected in the section 28 and is directed either to port 106 for flow at the spout 14 or to the passages 107 and 94 for delivery at a spray head connected in at the passage 95 in boss 17. I prefer that the member 11 (Fig. 3) be moved to its upright, full line position for selection of the full hot water flow, such that manipulation of the valve handle 13 may be effected without danger of contacting the spout 14 which will be hot during water flow.

In a valve structure of this character, it is preferred that the valves 75 and 76 operate to afford a mixing of the hot and cold water prior to actual discharge flow. This permits an accurate mixing regulation independently of volume flow regulation, so that there will be no change or variation in the desired temperature of the final mix during adjustment of the valve to throttle the flow. To obtain this improved result, I have incorporated the floating type piston valve 76 which acts to open the hot and cold water inlet conduits 62 and 67 for simultaneous flow to the chamber 54 below the piston 76. Thus, there can occur no change in the rate of supply of these fluids to the chamber 54 during the further control movement of the principal valve element 75 to throttle the mixed flow through the passage or port 77 in the piston 76. The fluid pressure at the under side of the piston 76 serves to drive it outwardly toward the stop elements 85 under the control of of the valve 75. This means that the hot and cold water lines of a general household water piping system are in cross communication at the chamber 54 when the member 11 is angularly turned to register its respective inlet ports 63 and 68 with the corresponding outlet ports 39 and 42 of body passages 37 and 40. It is obvious, should the floating piston 76 not be fully seated but left in the setting of Fig. 7, that a differential of pressure in either the hot or cold line pipes of the household system could cause cross-flow through the valve assembly in the direction toward the low pressure zone.

To prevent this latter eventuality, the piston valve 76 is made loose fitting in the valve chamber 54 to establish the previously described leakage passage from its under side, about its periphery and to the discharge side of the valve. Therefore, when the handle 13 is turned from its position 13F (Fig. 1) to position 13M, the principal valve 75 will close port 77. However, the pressure of the water under the piston 76 will produce a feel that the valve is fully closed when actually the floating piston has not been moved to its seated position, as shown in Fig. 4. The water will find its avenue of escape at the leakage passage and the small volume trickle at the spout 14, or at the spray head when the spout is swung to the position at Fig. 6, will serve as an indication that the valve has not been fully closed. Further turning effort at handle 13 will drive the floating piston to its fully seated position and stop the leakage. In so doing, this action definitely cuts off the cross-communication of the hot and cold water lines of the general system in which the valve is placed, so that the hot water cannot feed back to the cold water side, or vice versa.

In view of the above description, it is believed that the characteristics of construction of my preferred valve will be fully understood, and that its manner of selective regulation and control over hot and cold water supplies will become obvious. The form of the valve has been discussed in terms of its adaptability as a sink fixture. However, I contemplate that this valve be equally useful in connection with water control and supply for a tub and shower. The utility of my valve in this latter setting will now be described.

Referring to Fig. 10, I have illustrated the form of selector valve 18 which replaces the sink spout 14 and associated valve means 98 shown in Fig. 9. It must be understood that other parts of the valve, shown in Figs. 1 to 4 for example, are not altered or modified in any way as it affects the flow passages up to the selector valve 18. However, the adaptability of my valve for a shower-tub installation does require a slightly modified body casting to provide a suitable, depending threaded boss 19 which is similar to the first mentioned bosses 15, 16 and 17 (Fig. 2). In actual production, the body casting 10 may be made with these four bosses 15, 16, 17 and 19 as initial parts thereof, then one form of the body can be used for either purpose. When adapted for tub-shower use, the boss 19 is left on the body 10 at the under side of the body extension 32 (Fig. 10). In this form, the extension is transversely drilled to form a cylindrical bore 108 which opens at its bottom into the axial bore 109 drilled through boss 19, there being a bottom annular seat formed between these bores. A plug-type valve element 110 is rotatively mounted in the larger bore 108 to rest against the bottom seat. The element 110 is axially retained in position by a lock ring 111 at its upper peripheral edge, and a valve stem 112 projects outwardly of the valve bore 108. This stem 112 is engaged in a suitable socket of a valve cap 113, and a valve handle 114 is inserted in a bore transversely of the socket to pass through an aperture in the stem and thread into the end of the cap bore. This assembly secures the cap 113 and affords a simple means for operation of the valve 110. This valve assembly is sealed against leakage by suitable sealing elements in the cap grooves provided for the purpose, and by a bottom seal element carried in the bottom of the valve plug about the discharge passage 109.

The valve plug 110 is provided with a radially directed port 115 which opens from an axial bore 116, through the peripheral wall of the plug. In addition, the plug 110 contains a chordally directed passage 117 which has an angular relation with the radial port 115. The relation of the port and passage in the valve 110 is similar to the equivalent port 106 and passage 107 in the valve 98 for the sink spout 14 of Fig. 9. Thus, port 115 is movable into or away from the arcuate face 91 of the boss 90 in the body extension 32 to control flow of fluid through passage 109 in depending boss 19. Similarly, the chordal passage 117 is movable into or away from the arcuate face 96 at the end of the island boss 30 in the body passage section 28. When the port 115 is open to the passage 28, the passage 117 is closed, and fluid is delivered at the boss 19. Conversely, when the port 115 is closed, chordal passage 117 is open between the passage 28 and the passage 94 to deliver fluid at the boss 17. When connected in a tub-shower system, the boss 17 (Fig. 9) may be connected to the tub outlet (not shown) and boss 19 may be connected to the shower head (not shown). In this case, it is preferred that the handle 114 be substantially parallel with the axis of valve port 115 so that the handle will be in the position shown in Fig. 10 to indicate the direction of fluid flow to the tub by way of chordal passage 117 and boss 17, port 115 being closed at the arcuate face 91 to prevent flow at the boss 19 toward the shower. By moving handle 114, the fluid flow is altered to shift the supply to the shower while ending the flow to the tub outlet. The above description has been given with the assumed condition that the tub-shower valve assembly will be mounted in a vertical wall. It will be obvious, of course, that the valve may be installed in any other suitable manner, and that the tub-shower connections can differ from that mentioned without detracting from the utility of the valve.

Having fully described my improved valve in connection with two possible uses thereof, I wish it to be understood that I do not thereby limit the scope of the invention either as to its use or as to its characteristics of construction. What I do desire to secure by Letters Patent is:

1. In a valve assembly, a body having distinct fluid inlet passages and outlet passage means communicating with a point of discharge from the body, a member carried by said body and operatively positioned and formed to provide distinct fluid conduits connecting one with each of said body inlet passages and conduit means connecting with said body outlet passage means, said member providing a chamber into which each of said distinct conduits open and from which said conduit means leads, and valve means operatively mounted in said chamber, said valve means including a first valve element positioned to control the intermixing of fluid flowing into said chamber from said distinct conduits, and a second valve element adapted to regulate the flow of fluid from said chamber to said conduit means.

2. A valve fixture comprising a body having separate fluid inlet passages and common fluid outlet passage means; a member carried by said body and formed with a chamber, separate conduits opening between said chamber and said separate inlet passages, and other conduits opening between said chamber and said outlet passage means, a floating piston element disposed in said chamber to permit or prevent fluid flow into the chamber from one of said separate conduits, said piston element being subject to fluid inlet pressure and having a port therethrough, a valve element in control of said port in the piston element to regulate the fluid flow from said chamber to said other conduit means, said valve element being movable toward said piston element to close said port and displace the piston in a direction to prevent fluid flow into said chamber from said one conduit, and movable away from said piston element to open said port therein, and stop means in said chamber for limiting movement of said piston element to enable opening of the port therethrough upon movement of said valve element away from said piston element.

3. The combination in a fixture of the type described, of a member formed to provide a chamber, separate fluid inlet conduits opening to said chamber, and fluid outlet conduits opening from said chamber; a first valve element disposed in said chamber and formed with a port opening therethrough, said valve element being adapted to close one of said inlet conduits; a second valve element operatively disposed in said chamber to close said port in the first said element and urge the latter into conduit closing position, the first valve element being urged to open position under the influence of fluid pressure; and means for mounting said second valve element in said chamber and providing for movement of the latter relatively beyond said first valve element whereby to permit opening of said port and flow of fluid into said outlet conduits.

4. A water mixing valve comprising a body formed with hot and cold water inlet passages and water discharge passage means, a member carried by said body and formed with a chamber and separate conduits opening to the chamber at a common wall thereof, said conduits being directed toward separate ones of the inlet passages for delivery of hot and cold water to the chamber, a piston element movable in said chamber to engage said common wall and shut off cross-flow of water from one to the other of said conduits, said piston element having a port therein, a valve element cooperating with said piston element to close its port and urge the same into engagement with said wall in opposition to water pressure acting thereagainst, means mounting said valve element for movement in the chamber and acting to limit movement of said piston element out of wall engagement upon port opening movement of said valve element and thereby permit said valve element to move beyond said piston element to open its port, and conduit means disposed in said member and directed to open between said chamber and said discharge passage means in said body.

5. In a water control valve assembly for connection with sources of hot and cold water and arranged to direct the water flow toward either of two zones of discharge, the combination of a body having spaced hot and cold water inlet connections and a flow passage communicating with and leading from each inlet connection, and spaced water outlets having a common discharge passage in said body with which said outlets are adapted to communicate, a member movably carried by said body and formed with a valve chamber, a hot water conduit opening from the chamber toward the corresponding body flow passage for hot water, a cold water conduit opening from the chamber toward the corresponding body flow passage for cold water, and an outlet conduit opening from the chamber to said common discharge passage in said body, said body hot and cold water flow passages and the corresponding conduits in said member being arranged and related such that movement of the member relative to said body will selectively effect flow of hot, cold or variable proportions of both hot and cold water toward said valve chamber, a first valve element freely movable in said valve chamber and adapted to close an inlet conduit opening thereto against the inlet water pressure, said first valve element having a water flow port therein, and a second valve element movably disposed in said valve chamber to control said port, said valve elements having a range of concurrent movement to permit flow of water into said chamber, and mixing thereof when said member is moved to select both hot and cold water, and a range of relative movement to permit opening of said port and flow of water to said outlet conduit.

6. In a valve fixture for control of hot and cold water supplies, a body providing a seat area defined by spaced flat faces, interior passage sections in open communication and arranged with a passage section located adjacent each seat face to have a bore opening through the adjacent face, and distinctly separate hot and cold water inlet passages each directed to open through a seat face adjacent the bore therein, means communicating with an interior passage section for directing discharge of water from said body to a point of use, a water flow control member having working engagement with the body seat faces and formed with a chamber having valve seats in a wall thereof, said member further having water outlet conduits opening from said chamber to each of said body seat bores, and water inlet conduits opening through the valve seat wall of the chamber and directed one toward each of said inlet passage openings in the body seat faces, means to support said member on said body for selective movement in opposite directions whereby to register an inlet conduit and corresponding passage for distinguishing flow of hot and cold water into said chamber the inlet conduits and passages being arranged and related for concurrent flow of hot and cold water upon movement of said member intermediate said selective opposite directions, and a valve assembly operably disposed in said chamber for controlling the admission of water to said chamber and for throttling the flow of water from said chamber into said outlet conduits, said valve assembly including a floating element engageable on the chamber valve seats to prevent cross-communication of the hot and cold water supplies and determine complete stoppage of flow.

7. A control valve comprising a body casting providing spaced water inlet connections each having a passage opening therefrom and spaced water outlet means adapted for communication with a body water discharge passage, one of said water outlet means including a valve means carried by said body in position to control selectively the communication of said spaced water outlet connections with said discharge passage, a member rotatively carried by said body and formed with a valve chamber and spaced inlet and outlet conduits opening to and from the chamber respectively, said inlet conduits each being directed toward and corresponding with one of said body inlet passages, the conduits being adapted for flow communication therewith in a separate and a simultaneous order upon predetermined rotative movements of said member relative to said inlet passages, and said outlet conduits being directed for constant flow communication with said body discharge passage, and a valve assembly operatively mounted in said valve chamber to regulate the flow of water into said chamber and to throttle the flow of water from said chamber to said outlet conduits, said valve assembly including a first element movably disposed to regulate the flow of water into said chamber and being effective to establish a leakage path through the chamber, and a second element movable with the first element to prevent water flow out of the chamber and cut-off leakage through said leakage path, the second element further being movable relative to the first element to permit water flow out of the chamber.

TRYON S. LINDABURY.

REFERENCES CITED

The following references are of record in the file of this patent:

UNITED STATES PATENTS

| Number | Name | Date |
|---|---|---|
| 1,556,632 | Rouleau | Oct. 13, 1925 |
| 1,605,107 | Frost | Nov. 2, 1926 |
| 1,730,534 | Rosenbaum | Oct. 8, 1929 |
| 2,317,051 | Groen | Apr. 20, 1943 |